United States Patent Office 3,439,094
Patented Apr. 15, 1969

3,439,094
ANALGESIC COMPOSITIONS CONTAINING NAMOL XENYRATE, CAFFEINE AND ACETYL-p-AMINOPHENOL
Jane F. Emele, Morris Plains, N.J., assignor to Warner-Lambert Pharmaceutical Company, Morris Plains, N.J., a corporation of Delaware
No Drawing. Continuation-in-part of application Ser. No. 465,414, June 21, 1965. This application July 20, 1967, Ser. No. 654,684
Int. Cl. A61k 27/00
U.S. Cl. 424—253    3 Claims

ABSTRACT OF THE DISCLOSURE

The present invention relates to a novel method for producing analgesia in mammals by the oral administration of a combination containing the combination of namol xenyrate, acetyl-p-aminophenol and caffeine in the relative proportions of about 1 part by weight of namol xenyrate to about 1 part by weight of caffeine and 1 part by weight of acetyl-p-aminophenol.

---

This application is a continuation application of my co-pending application, Ser. No. 465,414, filed June 21, 1965, now abandoned.

This invention relates to novel analgesic compositions comprising the combination of namol xenyrate, caffeine and acetyl-p-aminophenol (APAP) and relates also to a method for producing analgesia in mammals by the oral administration of a composition comprising the synergistic combination of namol xenyrate, caffeine and APAP.

The continued search for analgesics which demonstrates significant improvement in analgesic action over known compounds has resulted in the discovery of namol xenyrate. Chemically, namol xenyrate is the 2-dimethyl-aminoethanol salt of 2-(-4-biphenyl)butyric acid having the formula:

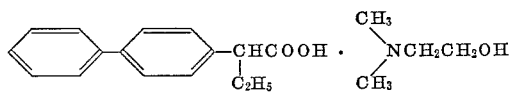

The preparation and properties of this drug are fully described in U.S. Patent No. 3,181,994.

The discovery of the action of namol xenyrate as an analgesic compound has been considered important in the art because the compound is not only chemically unique but also produces analgesia without undesirable side-effects. Thus, for example, the ability of drugs such as codeine to produce analgesia is recognized, but the administration of such drugs is also known to have certain liabilities including habituation and addiction as well as certain undesirable side-effects such as nausea, constipation or other effects due to the action of these substances on smooth muscle. On the other hand, the salicylates, for example, have none of the disadvantages associated with narcotic drugs but they do have a decreased level of analgesic efficiency when compared to narcotic analgesics.

Accordingly, the discovery that namol xenyrate has an analgesic action of the same order of activity as codeine but without the limitation of addiction and undesirable side-effects constitutes an outstanding contribution in achieving effective analgesia.

It has now been found that the very desirable analgesic activity of namol xenyrate can be further improved synergistically if it is administered in combination with caffeine and acetyl-p-aminophenol (APAP). Thus, in testing the combination with animals afflicated with pain, it has been observed that the pain can be relieved by giving a dosage of the combination of APAP, caffeine and namol xenyrate in which the respective components are present in a dose less than the known analgesic dose of each of the components comprising the combination. The discovery of this unexpected synergism in this combination is not only useful but its application in therapuetics is highly significant since it enables even small quantities of namol xenyrate to be used to produce a sustained and significant analgesic effect. In addition, since namol xenyrate does not produce anti-rheumatic or anti-inflammatory effects, this combination with APAP gives an added advantage in that the anti-rheumatic and anti-inflammatory effects of APAP may be enlarged.

The compositions prepared in accordance with this invention in addition to the active ingredients usually include inert pharmaceutical carriers to form oral dosage units such as tablets, capsules, syrups, elixirs, suspensions and the like. Preferred among these dosage forms are the solid dosage forms such as tablets and capsules which contain the components in a ratio of about 1 part by weight of namol xenyrate to 1 part by weight of caffeine and 1 part by weight of APAP.

The procedure best suited to demonstrate the synergistic effect of this composition is a modification of the phenyl-p-quinone test described by Siegmund et al., J. Pharm. Exptl. Therap. 119, 453 (1957) and Emele et al., J. Pharm. Exptl. Therap. 134, 206 (1961). In this procedure the pain is induced in the test animals, usually mice, by the intra-peritoneal injection of an irritant such as phenyl quinone. This injection produces a writhing syndrome including intermittent contraction of the abdomen as well as spinning and rotation of the trunk and extension of the rear limbs. All the test mice exhibit this symptom within 10 minutes after the injection and accordingly the count of time used in these experiments is the ten minute interval. In carrying out the test, groups of 10 mice per dose level are employed. The mice are given phenyl-p-quinone intraperitoneally in the form of a 0.02% solution in alcohol administered 15 minutes after the oral administration of a composition containing namol xenyrate, APAP and caffeine in the ratio of 1:1:1. The 15 minute time element is chosen because in previous experiments it has been found that namol xenyrate reaches a peak of analgesic activity at approximately this time interval. Drug dose response curves are established on the basis of an all or none response. The effective dose 50 ($ED_{50}$) whereby 50% of the treated animals exhibit an analgesic action from the drug combination is calculated according to the method of Lichfield et al., J. Pharm. Exptl, Therap. 93, 99, 1949.

It has been found that a composition containing 1 part namol xenyrate, 1 part APAP, and 1 part caffeine has an $ED_{50}$ of 62 mg./kg. The $ED_{50}$ of namol xenyrate alone is 32 mg./kg. while that of APAP alone is 280 mg./kg. and that of caffeine is 700 mg./kg.

In order to further illustrate this invention, the following example is given:

Example

A mixture containing 100 grams namol xenyrate, 100 grams APAP and 100 grams caffeine are blended together and screened through a No. 60 sieve. 100 mg. of the resulting mixture is then filled into No. 3 color hard gelatin capsules yielding a dosage form in which each capsule contains 0.100 gram namol xenyrate, 0.100 gram APAP, and 0.100 gram caffeine. These capsules can be administered as needed for the relief of pain such as headache or muscular pain.

It is understood that the foregoing detailed description is given merely by way of illustration and that many variations may be made without departing from the spirit of the present invention.

Having described my invention what I desire to secure by Letters Patent is:

1. An analgesic composition for oral administration in dosage unit form containing a solid pharmaceutical carrier and as active ingredients the combination of namol xenyrate, acetyl-p-aminophenol and caffeine in the relative proportions of about 1 part by weight of namol xenyrate to about 1 part by weight of caffeine and 1 part by weight of acetyl-p-aminophenol.

2. Process for the production of analgesia in mammals afflicted with pain which comprises the oral administration to mammals of the composition in accordance with claim 1.

3. Process for synergizing the analgesic effect of namol xenyrate in mammals afflicted with pain which comprises the oral administration to mammals of a mixture of 1 part by weight of namol xenyrate and 1 part by weight of acetyl-p-aminophenol with about 1 part by weight of caffeine.

References Cited

UNITED STATES PATENTS 3,181,994　5/1965　Dubnick.
3,218,233　11/1965　Lewenstein.

OTHER REFERENCES

Merck Index, 7th edition (1960), p. 537–538.

ALBERT T. MEYERS, *Primary Examiner.*

S. J. FRIEDMAN, *Assistant Examiner.*

U.S. Cl. X.R.

424—314, 324